US009931913B2

(12) United States Patent
Prevost et al.

(10) Patent No.: US 9,931,913 B2
(45) Date of Patent: Apr. 3, 2018

(54) DEVICE FOR MOVING AT LEAST ONE DOOR LEAF, VEHICLE PROVIDED THEREWITH AND ASSOCIATED METHOD

(71) Applicant: Faiveley Transport Tours, Saint-Pierre-des-Corps (FR)

(72) Inventors: Jany Prevost, Saint-Avertin (FR); Joan Carrion Espeleta, Tarragona (ES); Nicolas Pierre, Saint-Regle (FR); Philippe Vaucelle, Joue les Tours (FR)

(73) Assignee: FAIVELEY TRANSPORT TOURS, Saint-Pierre-des-Corps (FR)

( * ) Notice: Subject to any disclaimer, the term of this patent is extended or adjusted under 35 U.S.C. 154(b) by 187 days.

(21) Appl. No.: 14/780,406

(22) PCT Filed: Feb. 24, 2014

(86) PCT No.: PCT/FR2014/050376
§ 371 (c)(1),
(2) Date: Sep. 25, 2015

(87) PCT Pub. No.: WO2014/154964
PCT Pub. Date: Oct. 2, 2014

(65) Prior Publication Data
US 2016/0046176 A1    Feb. 18, 2016

(30) Foreign Application Priority Data
Mar. 29, 2013  (FR) ...................................... 13 52939

(51) Int. Cl.
*B60J 5/06* (2006.01)
*E05D 15/10* (2006.01)
(Continued)

(52) U.S. Cl.
CPC ............. *B60J 5/062* (2013.01); *B60J 5/0477* (2013.01); *B61D 19/005* (2013.01); *B61D 19/02* (2013.01);
(Continued)

(58) Field of Classification Search
CPC ..... B60J 5/00; B60J 5/04; B60J 5/0401; B60J 5/06; B60J 5/062; B60J 5/08; B60J 5/12; B60J 5/14
See application file for complete search history.

(56) References Cited

U.S. PATENT DOCUMENTS

| 4,000,582 A | 1/1977 | Monot |
| 5,341,598 A | 8/1994 | Reddy |

(Continued)

FOREIGN PATENT DOCUMENTS

| CN | 1198997 | 11/1998 |
| CN | 1476394 | 2/2004 |

(Continued)

OTHER PUBLICATIONS

PCT/FR2014/050376 International Search Report dated May 22, 2014 (4 pages including English translation).

Primary Examiner — Robert J McCarry, Jr.
(74) Attorney, Agent, or Firm — Brinks Gilson & Lione; G. Peter Nichols

(57) ABSTRACT

A device for moving at least one door leaf, includes a fixed beam that is fixed to the frame, a moving beam that is connected to the fixed beam by swinging rails which allow it to move transversely with respect to the axes of elongation of the fixed and moving beams, a motor which drives the leaf in a movement parallel to the axis of elongation of the moving beam and which, during the swinging of the leaf, also drives a drive cam which is provided with a slot in which there is engaged a pin that is fixed to the fixed beam,
(Continued)

and a central roller which is connected to the moving beam and circulates in a groove in the fixed beam during the movement of the leaf.

16 Claims, 9 Drawing Sheets

(51) Int. Cl.
*E05F 15/646* (2015.01)
*E05F 15/643* (2015.01)
*E05F 15/662* (2015.01)
*B60J 5/04* (2006.01)
*B61D 19/00* (2006.01)
*B61D 19/02* (2006.01)
*E05F 15/652* (2015.01)

(52) U.S. Cl.
CPC ........ *E05D 15/1068* (2013.01); *E05F 15/643* (2015.01); *E05F 15/646* (2015.01); *E05F 15/662* (2015.01); *E05D 2015/1071* (2013.01); *E05F 15/652* (2015.01); *E05Y 2201/238* (2013.01); *E05Y 2201/404* (2013.01); *E05Y 2201/434* (2013.01); *E05Y 2201/638* (2013.01); *E05Y 2201/696* (2013.01); *E05Y 2600/322* (2013.01); *E05Y 2800/73* (2013.01); *E05Y 2900/51* (2013.01)

(56) References Cited

U.S. PATENT DOCUMENTS

| | | |
|---|---|---|
| 5,893,236 A | 4/1999 | Krbec |
| 6,792,717 B2 | 9/2004 | Carlsson |

FOREIGN PATENT DOCUMENTS

| | | | |
|---|---|---|---|
| CN | 1818311 | 8/2006 | |
| DE | 10158094 | 7/2003 | |
| DE | 20316763 U1 | 3/2005 | |
| DE | 20 2005 015166 U1 | 2/2007 | |
| DE | 202005015166 * | 2/2007 | ............... B60J 5/06 |
| JP | 2005-061065 | 3/2005 | |
| RU | 2114976 | 7/1998 | |

* cited by examiner

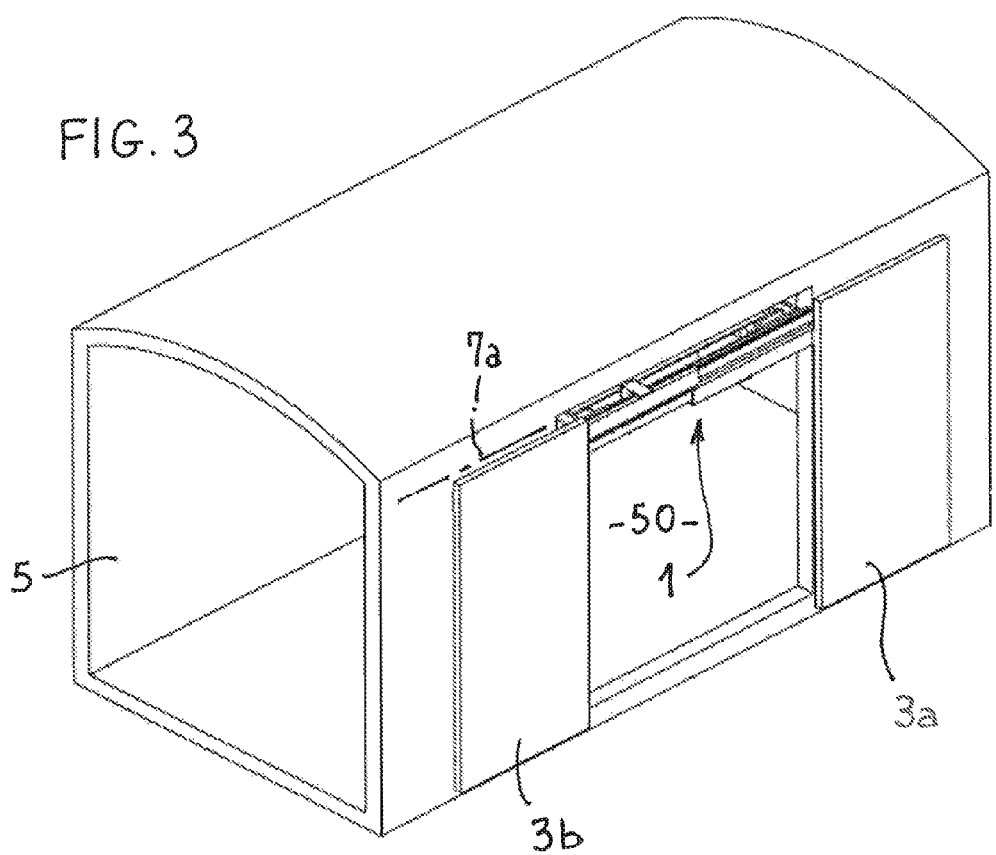
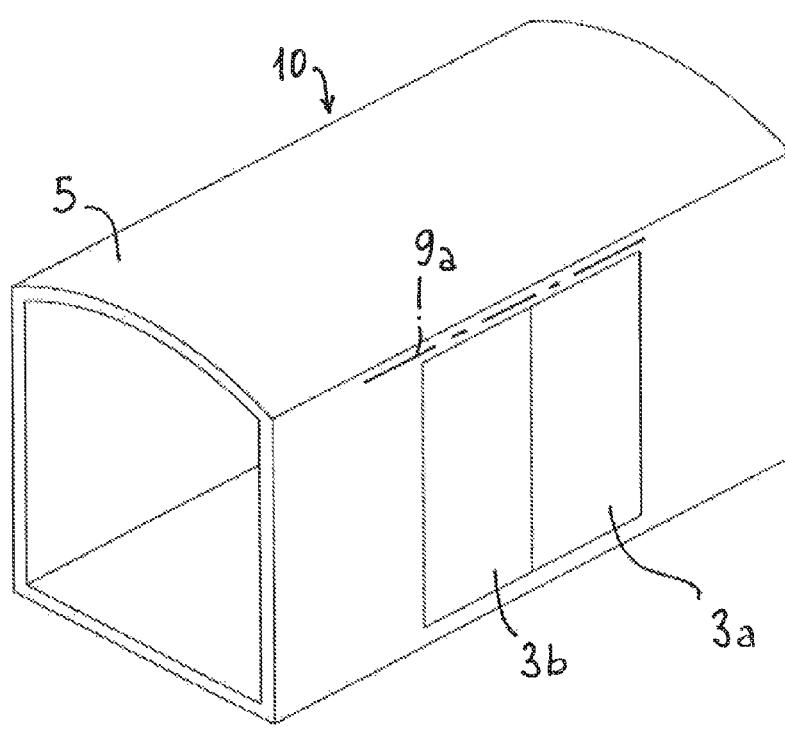

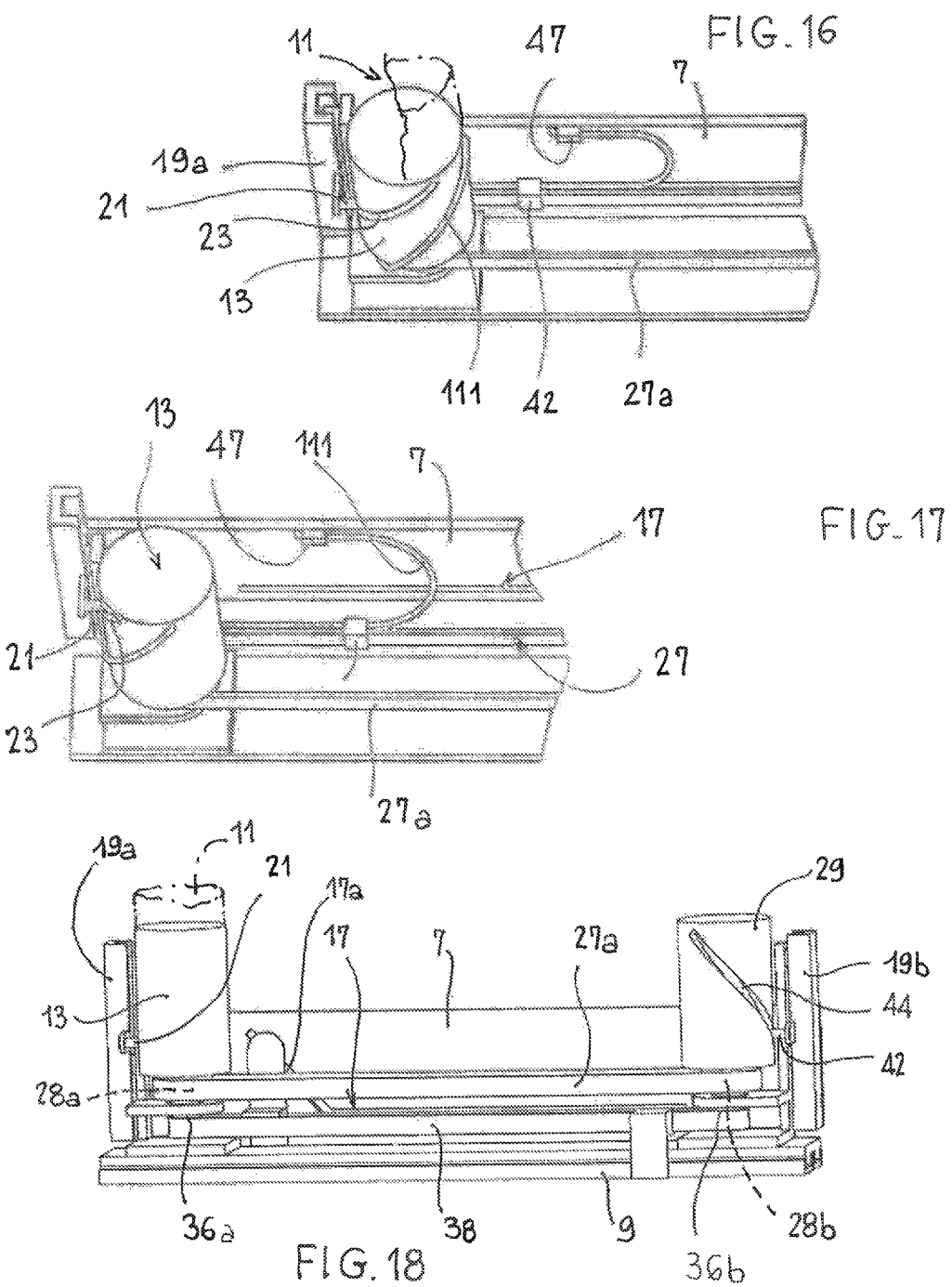

DEVICE FOR MOVING AT LEAST ONE DOOR LEAF, VEHICLE PROVIDED THEREWITH AND ASSOCIATED METHOD

This application claims priority to International Application No. PCT/FR2014/050376 filed Feb. 24, 2014, and to French Application No. 1352939 filed Mar. 29, 2013; the entire contents of each are incorporated herein by reference.

The invention relates to a device for moving at least one transport vehicle door leaf to allow passengers to enter and exit.

Such a vehicle comprises a body with respect to which the (each) leaf can move between respectively open and closed positions.

It is the tramways that are particularly targeted here.

The deficiencies of the existing solutions include the fact that:

they are very bulky,
they are very heavy,
they are very noisy,
the drive and/or guidance of the (each) leaf leave room for improvement.

In order to overcome at least some of these disadvantages and provide a relevant solution thereto, it is proposed that the aforementioned movement device should comprise:

a fixed beam, fixed to the body of the vehicle and having an axis of elongation,
a mobile beam having an axis of elongation substantially parallel to that of the fixed beam and connected to the leaf which is able to slide along the mobile beam, which beam is connected to the fixed beam by maneuvering rails that are fixed with respect to the fixed beam and that support said mobile beam thereby allowing the mobile beam a movement that is transverse with respect to the axes of elongation of the fixed and mobile beams,
a motor fixed to the mobile beam which drives the leaf in a movement parallel to the axis of elongation of the mobile beam and, during the maneuvering of the leaf, further drives a driving cam which is provided with a slot in which is engaged a pin fixed to the fixed beam,
and a central roller connected to the mobile beam, fixed to the leaf and which runs in a groove of the fixed beam as the leaf moves.

The above chooses to mention just one leaf but applies equally to leaves in the plural, and in particular two leaves, as does the description that follows.

For operational safety and reliability it is advisable for leaf hangers to be fixed to the mobile beam in order to connect it to the leaf.

To allow the movement to be orientated from 0 to 90° at the end of closing or at the start of opening (therefore with maneuvering) of the leaf (leaves) and allow the dynamics to be readily engineered, it is recommended that the groove of the fixed beam, which extends horizontally, should have, toward one end, a part extending at an angle with respect to the axis of elongation of the fixed beam.

For a parallel movement of the mobile beam with respect to the fixed beam during the maneuvering movement and therefore to prevent the mechanism from jamming, it is advisable that the motor should extend along one of the maneuvering rails, along an axis of rotation transverse to the axis of elongation of the fixed beam and should bear the driving cam coaxially, which cam, via a pairing means, drives a driven cam arranged along the other rail, the latter cam comprising a slot in which a second pin fixed to the fixed beam is engaged.

In order for the motor to be able simultaneously to drive the leaf or leaves in their translational movements and to drive the mobile beam in the maneuvering movement, provision is made:

for a first output of the motor to drive directly or by reduction gear an intermediate means of driving the leaf (for example a belt),
and for the motor to have a stator which will rotate in accordance with the principle of the rotating stator, in its movement driving the driving cam which will be secured to it, rolling bearings permitting that when the central roller reaches said part of the groove that extends at an angle.

One alternative would be to use reduction gear with two outputs (for example epicyclic reduction gear) rather than using the principle of the rotating stator.

In the case of a door that has two leaves, the driving of the second leaf may be achieved using the same drive means as the first leaf, for example by using the return of the driving belt to generate a movement in the opposite direction to the first leaf.

The driving cam will preferably comprise a guide rail designed such that the rotation of the stator of the motor combines with the maneuvering movement by virtue of the maneuvering roller which is fixed with respect to the fixed beam. This first part of the rail will then be in the form of a helix.

Thus, it is recommended that the first part of the slot of the driving cam should have the form of a helix of axis transverse to the axes of elongation of the fixed and mobile beams.

And to complete the movement and secure the closure of the leaf, it is advisable that an(other) part of the slot of the driving cam should have the form of a portion of a circle of axis parallel to the axis of elongation of the fixed beam.

It is moreover recommended that a return means should return the driven cam such that the second pin remains engaged in the circular-arc portion of the slot, the pairing means forcing the first pin and the driving cam to adopt the same relative position.

Thus, for example, via a return spring the driven cam will be able to be returned to the locked position and a certain effort will be required in order to unlock the door.

As the motor performs an overall rotation of 180°, it has been necessary to design a system for guiding its power cable.

Thus it is proposed that the motor be electrically powered by a cable which passes along the pairing means and around the cam, and which is fixed to the cam and to the pairing means by tabs positioning it in line with the pairing means.

Aside from the aforementioned device, considered in respect of all or some of the features thereof, the invention also relates to a rail transport vehicle comprising:

its body,
at least one door leaf allowing passengers to enter and exit the body and with respect to which the leaf moves between respectively open and closed positions,
and the aforementioned device.

In order to ensure that the load generated by the cam in the event of a pressure wave does not cause the locking roller to move in the direction of unlocking, it is recommended that the part of the slot of the driving cam which has the form of a portion of a circle of axis parallel to the axis of elongation of the fixed beam, should extend with an orientation that is slightly re-entrant toward the inside of the slot, with the shape of a dovetail.

The invention here also relates to a method for moving at least one door leaf along an opening of a transport vehicle body, between respectively closed and open positions allowing passengers to enter and exit the vehicle.

According to one important aspect aimed once again at overcoming at least some of the disadvantages initially listed and at providing a relevant solution thereto, the idea is for the leaf to be forced to move along the opening, with maneuvering with respect to the body of the vehicle, this being achieved:

by using a motor to make a central roller fixed to the leaf run along the opening of the body in a groove of an elongate fixed beam fixed to this body, and, at the end of the movement of the leaf in the direction of closing or at the start of the movement in the direction of opening, imparting to a mobile beam connected to the leaf a transverse movement with respect to the axis of elongation of the fixed beam, in maneuvering rails which are fixed with respect to the body using the motor and the central roller the path of which, imposed by said groove, imposes the transverse movement by a part of the groove of the fixed beam which extends at an angle with respect to the axis of elongation of this fixed beam.

In order to guide the/each leaf effectively, it is also recommended:

that said transverse movement of the mobile beam should maintain the parallelism of the mobile and fixed beams by virtue of two pins which respectively run in a first and a second slot, at least partially shaped as a helix, one of them belonging to a driving cam driven by the overall rotation of the motor and the other belonging to a driven cam driven by the driving cam by virtue of a pairing means, and/or that, as the leaf maneuvers, the motor, fixed to the mobile beam, should be made to drive a driving cam provided with a slot in which a pin fixed to the fixed beam is engaged.

It is moreover advisable to ensure the locking of the leaf (or of the leaves) in the closed position:

by making the two pins run respectively in the first and second slots of which part has the form of a portion of a circle of axis parallel to the axis of elongation of the fixed beam extending with an orientation that is slightly re-entrant toward the inside of the slot, in the shape of a dovetail, and by keeping said two pins in position using a return means which urges one of the cams in such a way that the pin it accommodates remains engaged in the circular-arc portion of the slot with which it is provided, the pairing means forcing the other pin and the other cam to adopt the same relative position.

Other features and advantages of the solutions set out herein will become further apparent if necessary from the following description given by way of nonlimiting example with reference to the attached drawings in which:

FIGS. 1, 2, 3, 4 show a diagram of a vehicle the door of which comprises one or two leaves illustrated closed or open;

FIGS. 13, 18 show the fixed beam and its environment, from above and from below respectively, FIGS. 14, 15, 16, 17 show details viewed from the inside of the vehicle, on the driving cam side.

Figure 20:
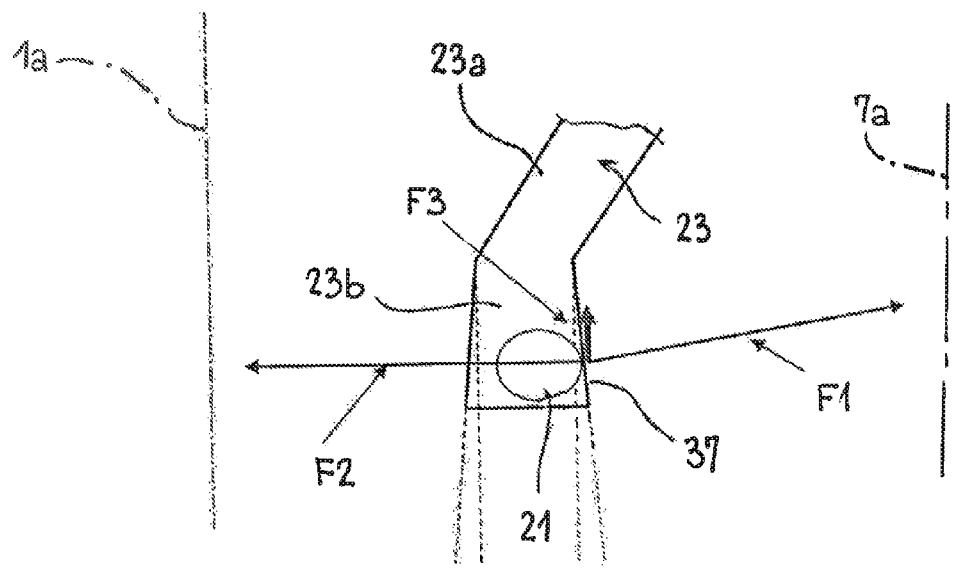

and FIG. 20 shows the principle of the locking.

Figure 1:
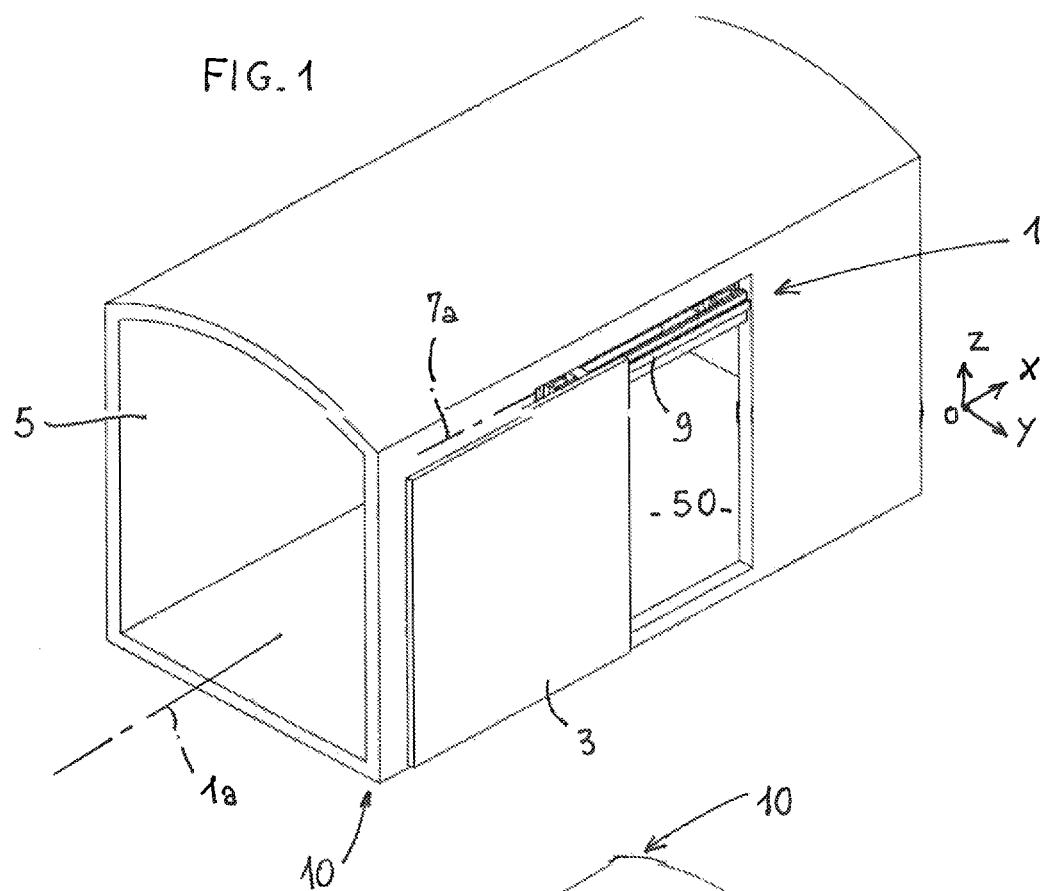
Figure 2:
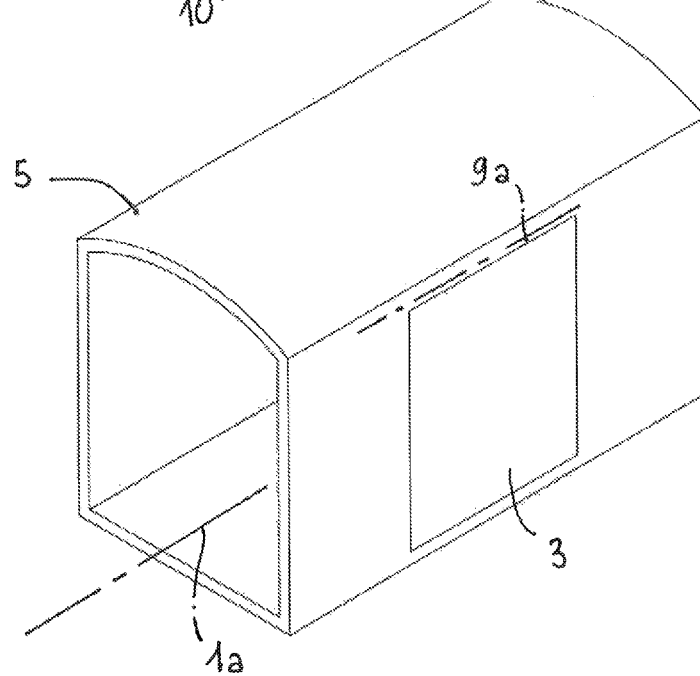

FIG. 1 shows a device 1 for moving at least one transport vehicle door leaf 3a allowing passengers to enter and exit. A solution comprising two leaves 3a, 3b is illustrated notably in FIGS. 3 and 4.

This device in fact allows the leaf or leaves to move with respect to the body 5 between respectively an open position (FIGS. 1, 3, 5, 6) and a closed position (FIGS. 2, 4, 7, 8) and this or these leaves to be locked in the closed position.

In this instance, the vehicle 10 is a rail transport vehicle.

It may be a tram car with respect to which the leaf 3a and/or 3b moves between respectively open and closed positions.

Figure 5:
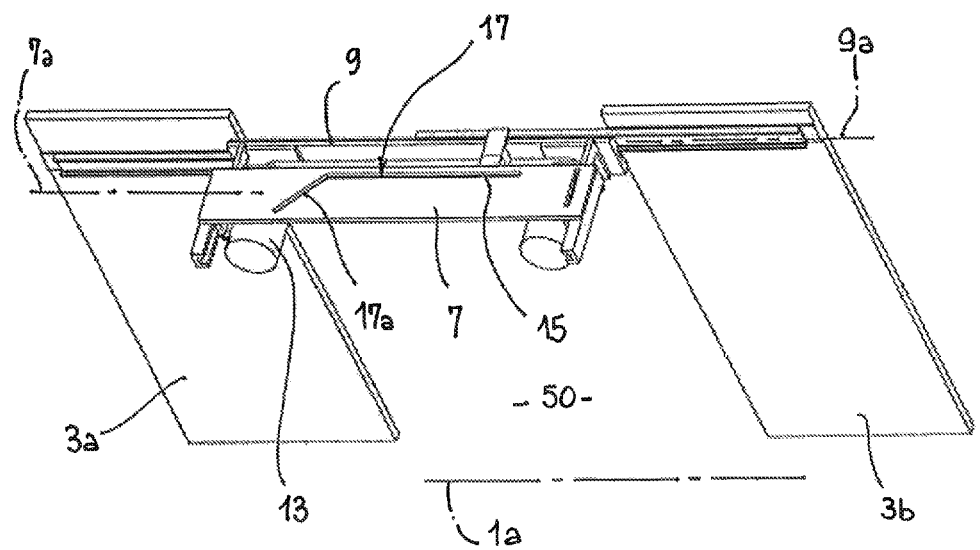
FIGS. 5, 6, 7, 8 show two leaves which are open then closed, viewed from inside the vehicle, with the mechanism proposed here.

As detailed in FIG. 5 et seq., the device 1 with which the vehicle is equipped comprises:

a fixed beam 7, fixed to the body 5, a mobile beam 9 connected to the leaf 3, which slides along the mobile beam 9 and has a sliding/maneuvering movement with respect to the fixed beam 7, a motor 11 fixed to the mobile beam and which, during the maneuvering of the leaf, further drives a driving cam 13, and a central roller 15 connected to the mobile beam, fixed to the leaf, such as 3a, and which runs in a groove 17 of the fixed beam 7 during the movement (axial sliding and maneuvering) of the leaf.

The fixed beam 7 has an axis of elongation 7a which here is parallel to the longitudinal axis 1a of the vehicle 1.

The mobile beam 9 has an axis of elongation 9a substantially parallel to that of the fixed beam.

This mobile beam is connected to the fixed beam 7 by maneuvering rails 19a, 19b (FIG. 6 et seq.) which are fixed with respect to the fixed beam and which support the mobile beam while allowing this mobile beam a movement that is transverse with respect to the axes of elongation 7a, 9a of the fixed and mobile beams.

Figure 6:
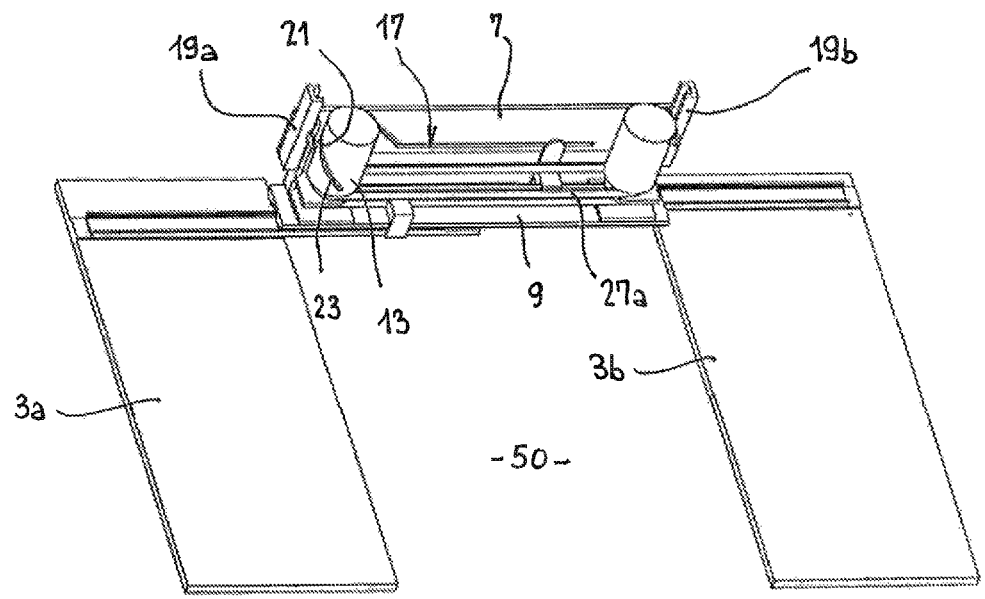

Moreover, the driving cam 13 is provided with a slot 23 (FIG. 9 notably) in which there is engaged a pin 21 fixed to the fixed beam 7 (FIG. 6).

The motor 11 drives the relevant leaf in a movement parallel to the axis of elongation 9a of the mobile beam.

Figure 11:
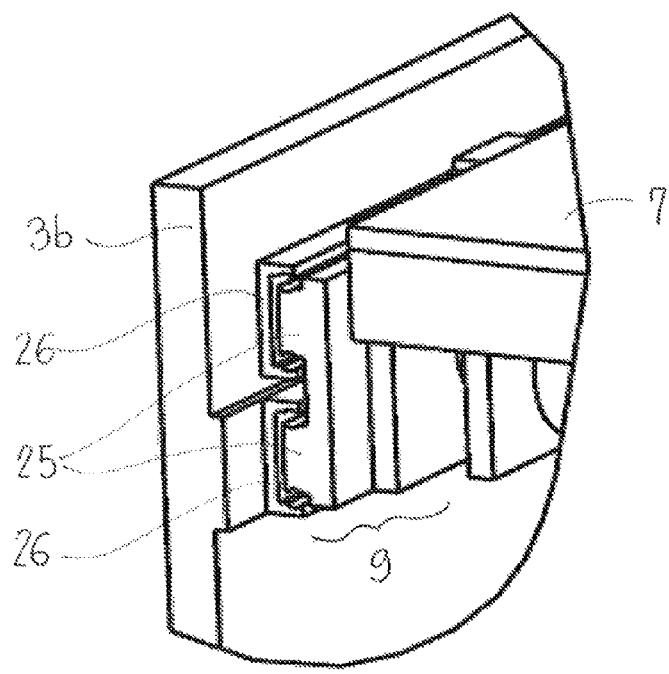
FIGS. 11, 12 show the leaf/mobile-beam/fixed-beam connection in two embodiments.
Figure 12:
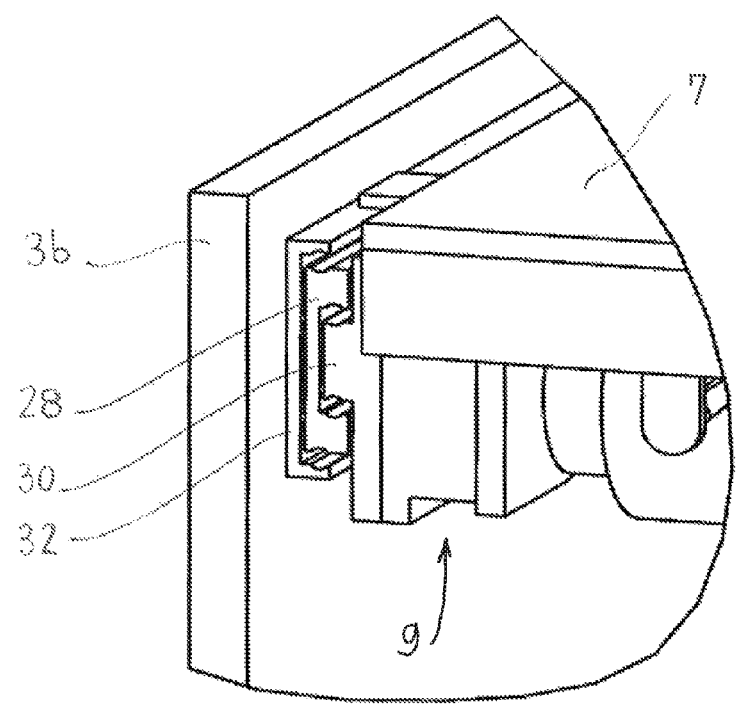

The or each leaf is preferably held or supported in accordance with conventional principles, by at least one slider 25 (belonging to the mobile beam 9) moving inside at least one C-section rail 26, with balls between the two to allow sliding (see FIG. 11) or telescopic rails consisting of a double system of slider and rail nesting inside one another and deploying in the manner of a telescope (see 28/30 and 30/32 in FIG. 12 in which the slider 30 belongs to the mobile beam 9). These means, which are therefore connected to the mobile beam 9, will then provide the connection between beam 9 and leaf.

Figure 7:
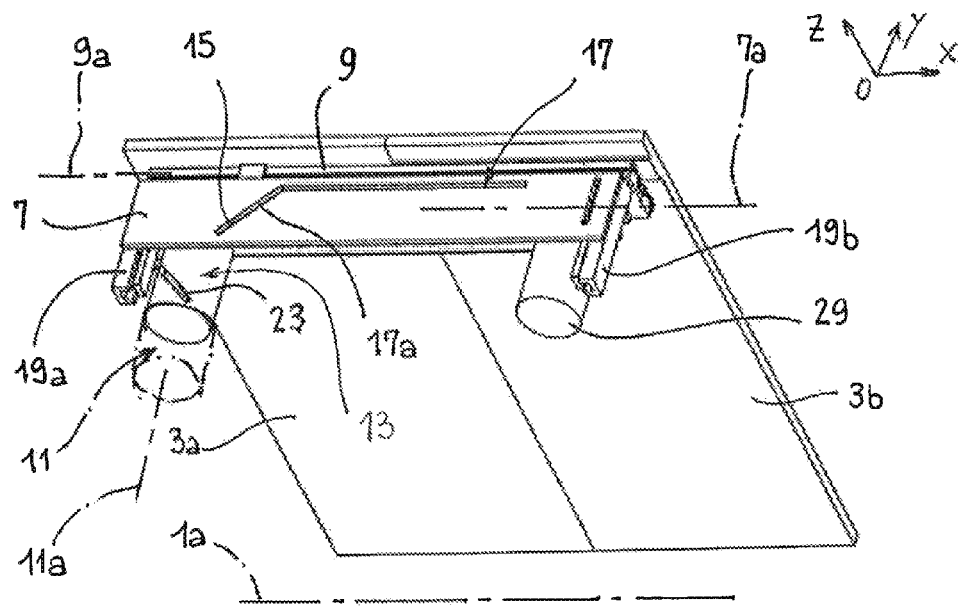
Figure 8:
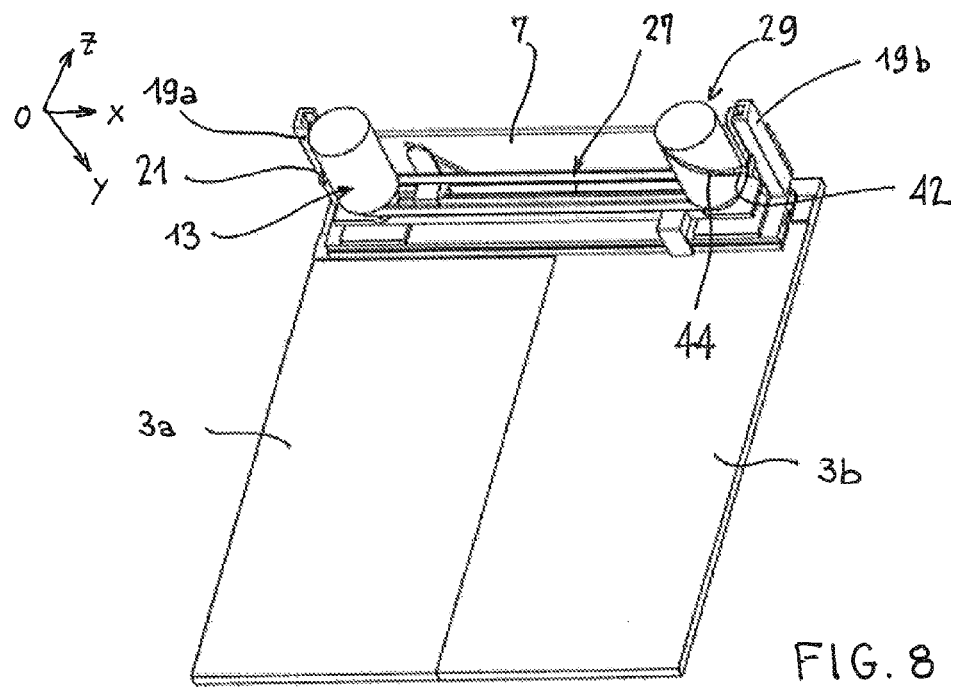

In FIG. 7 for example it may be seen that the groove 17 of the fixed beam 7 extends horizontally (axis X) and has, toward one end, a part 17a extending at an angle with respect to the axis 7a of elongation of the fixed beam, the purpose of this being to force the relevant leaf (leaves) to maneuver.

Figure 13:
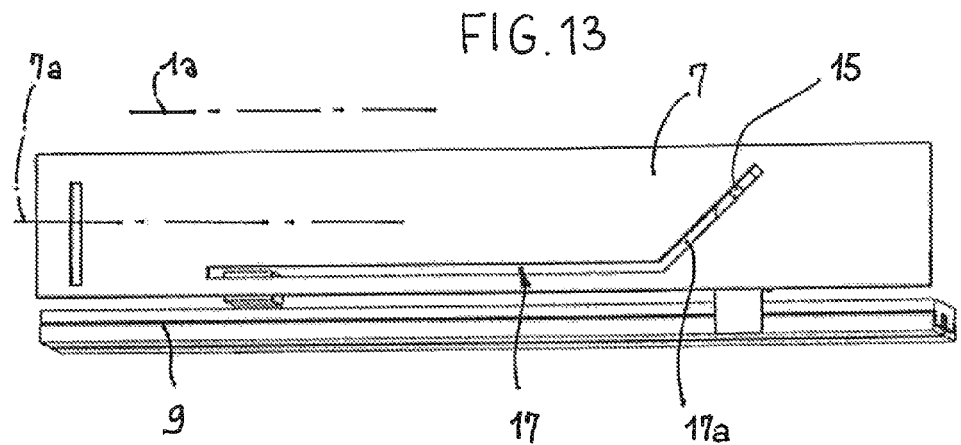
Figure 14:
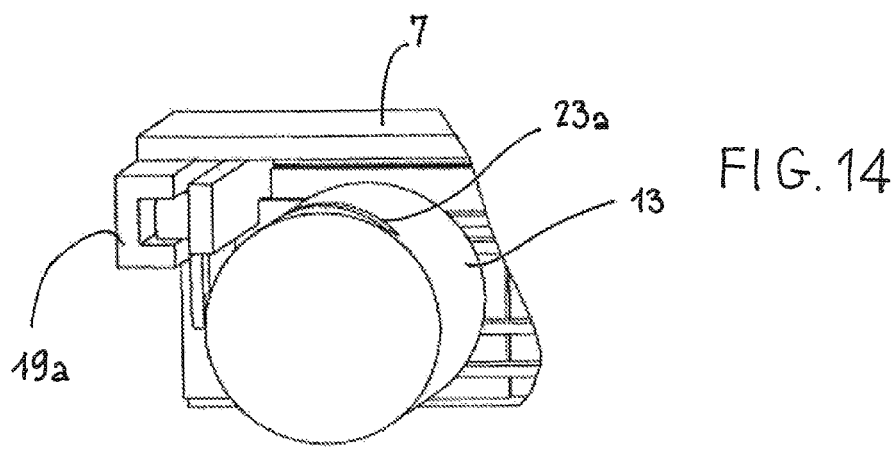

The dynamics are chiefly imposed by the guidance present on the fixed beam 7. Thus, during the closing and opening movement of the relevant leaf (leaves), the central roller 15 (see FIGS. 5, 7, 13) moving as one with this leaf such as 3a or one of the leaves, forces the leaves (if the door is made up of two leaves) to effect a translational (sliding) movement. At the end of the movement in the direction of closing, or at the start of the movement in the direction of opening, this central roller forces the entire mobile part of the door, namely the mobile beam 9, the leaves (3*a*, 3*b* FIG. 2) and the drive mechanism to effect a maneuvering movement by virtue of the change in direction of guidance which is typically oriented at around 45° with respect to the longitudinal axis 1*a* of the vehicle. The principle does, however, allow an orientation from 0 to 90° in order to adapt the dynamics accordingly. During this phase, the longitudinal movement of the leaves continues in synchronism with the maneuvering movement unless the orientation of the guide is at 90°.

FIG. 7 notably shows that the motor 11 extends along one of the maneuvering rails 19*a*, along an axis of rotation 11*a* that is transverse (in this instance horizontal and perpendicular) to the axis 7*a* of elongation of the fixed beam.

Figure 15:
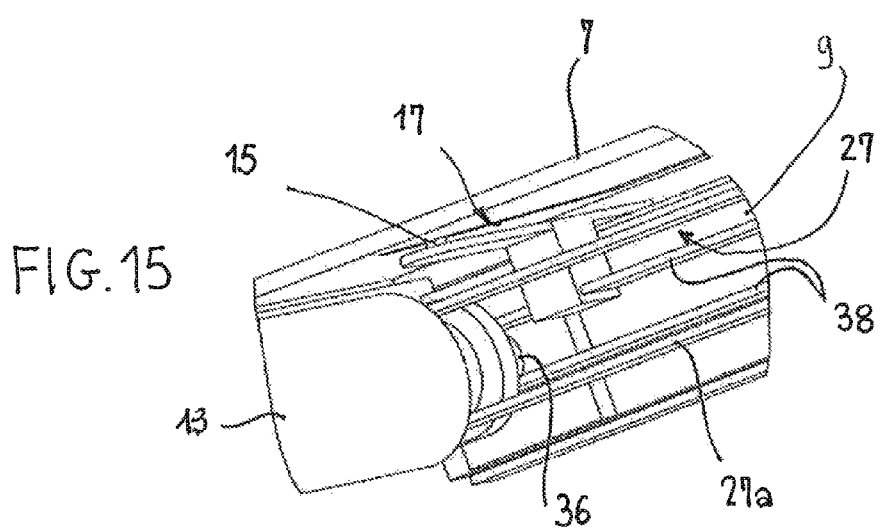

This motor coaxially bears the driving cam 13 (see notably FIG. 9) which, via the pairing means 27 (see notably FIG. 15), drives the driven cam 29 arranged along the other rail 19*b* (notably FIGS. 7, 18). The pairing means 27 may preferably comprise the belt 27*a* driven by the respectively driving 28*a* and driven 28*b* pairing pulleys.

Figure 9:
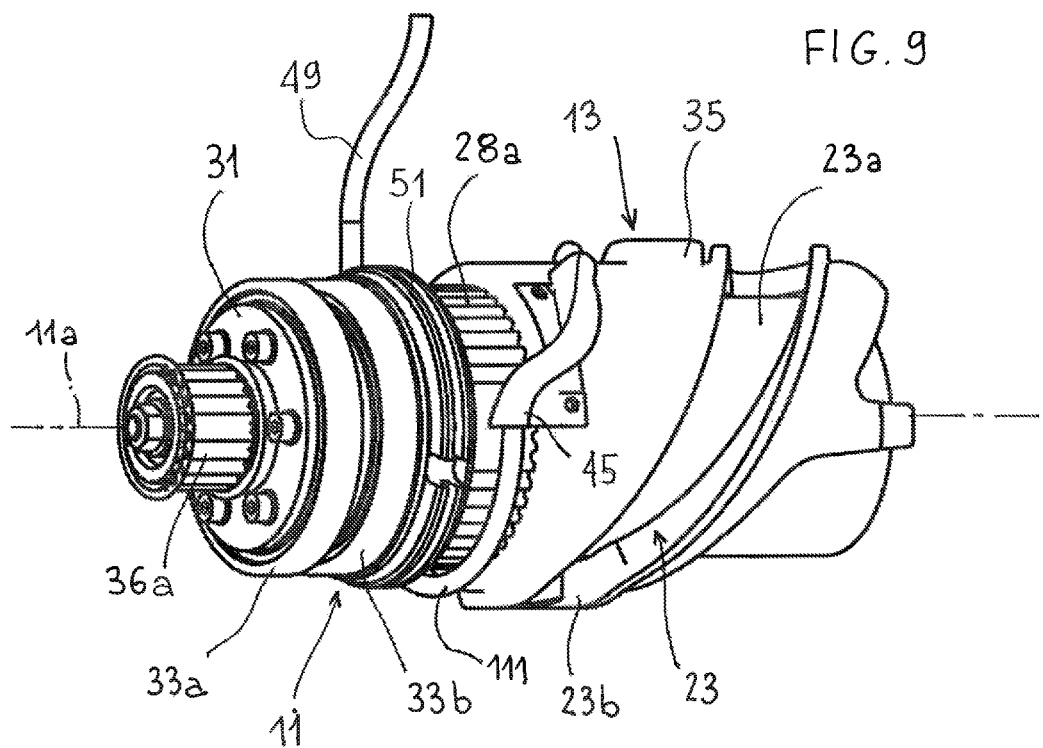
FIGS. 9, 10 show respectively the driving cam (with its motor) and the driven cam.
Figure 10:
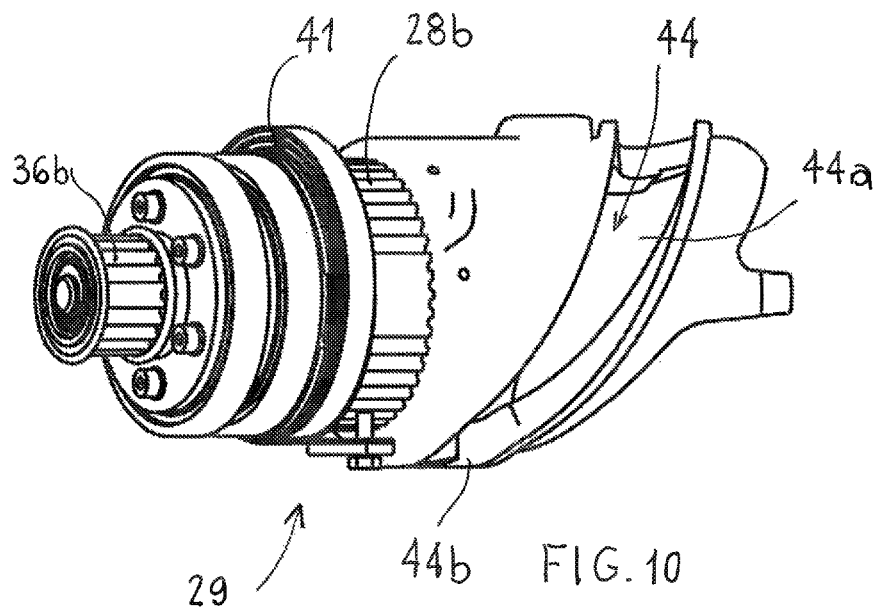

The motor 11 will be connected directly or, as shown in FIG. 9, by reduction gear 31, to the means of driving the leaf (leaves), in this instance the pulley 36*a* that drives the belt 38 which is returned over the other pulley 36*b* (FIGS. 9, 10, 18). Its stator can thus rotate in accordance with the principle of the rotating stator, in its movement driving the cam 13 secured to it. Remember that the principle of the moving stator amounts to allowing the stator to rotate when the rotational load on the rotor is too great or when the movement of the rotor is blocked. According to the principle of action and reaction, it is then the stator that rotates in the opposite direction provided its movement is permitted. In the case shown, two rolling bearings 33*a*, 33*b* installed around reduction gear 31 or around the motor allow this movement when the central roller 15 reaches the guide zone oriented at 45°.

As preferred, if reduction gear 31 is provided, the motor 11 will be connected via this reduction gear to the pulley that drives the leaf.

The slot, such as 23 in FIG. 9, is designed in this instance so that the rotation of the stator of the motor 11 is combined with the maneuvering movement of the mobile part of the door by virtue of the pin 21 (notably FIG. 6). This first part 23*a* of the slot therefore has the form of a helix of axis 11*a*.

The guide slot 23 also allows the door (the/each leaf) to be locked. A second part 23*b* of the slot is thus a portion of a circle of axis 23*b* perpendicular to the axis 7*a* of elongation of the fixed beam (or, as here, perpendicular to the longitudinal axis 1*a* of the vehicle).

An appendage 35 on the cam may allow end-of-locking travel contact to be established.

In order to ensure that the load generated by the cam in the event of a pressure wave does not cause the locking roller to move in the direction of unlocking, the orientation of the lateral walls of the guide rail may be slightly re-entrant in the form of a dovetail 37 (a trapezium-shaped tenon), as shown in FIG. 20.

From this figure it will be appreciated that, in the rail transport vehicle, the second part 23*b* of the slot extends with this shape at the end of the slot 23. F1 shows the force of reaction of the roller on the cam 13 engaged at the end of the slot, F2 shows the force generated by the pressure wave on the cam, and F3 is the resultant of the forces exerted on this cam (excluding the force of the spring 41). F3 does indeed have a tendency to cause the cam 13 to rotate toward more confirmed locking.

The door (leaf) driving part and the driven part may be synchronized or paired using a belt, such as the belt 27*a*, using cables or using a chain, which will then force the second (driven and therefore non-motorized) cam 29 to adopt the same movement as the driving cam 13. The driven cam 29 therefore collaborates with the rail 29*b* via the pin 42 engaged in the slot 44 (FIGS. 10, 18), which have the aforementioned features of the elements 21, 23 respectively. Guidance similar to that of the driving cam will thus allow the same maneuvering movement to be imparted to the driven part 29 and allow locking to be confirmed. The return spring 41 also allows the driven cam to be returned to the locked position and imposes a minimum effort threshold required for unlocking the door (leaf); see FIG. 10. This unlocking effort is transmitted to the driving cam 13 by the pairing belt 27*a* (or any means 27 performing the same function, such as a chain). Using this spring 41, the pin 42 will remain engaged in the circular-arc shaped portion 44*a* of the slot, the pairing means 27 transmitting the unlocking effort to the driving cam. The return means 41 will return the driven cam 29 in such a way that the second pin 42 remains engaged in the circular-arc portion 44*a* of the slot, the pairing means 27 forcing the same relative position on the opposite side, between the first pin 21 and the driving cam 13.

Like with the helical parts, it is advisable for part of the slots 23*b*, 44*b* of the two cams, driving and driven, to have a form as a portion of a circle of axis parallel to the axis 7*a* of elongation of the fixed beam. This will then help keep the door in balance.

If, as proposed as a preference, in the aforementioned openings and closings of the door the motor 11 rotates for example by 180° about its axis, a system for guiding its power cable 111 is advisable.

In particular (see FIGS. 9, 16, 17), the (each) cable 111 may preferably pass along and around the pairing means 27 and the relevant cam, 13 in the example. This cable will then preferably be fixed to the cam and to the pairing means by tabs, such as 43, positioning it in line with the pairing means.

Thus, the pairing belt 27*a* will perform the function of a cable bearing chain. A tube 45 (FIG. 9) or some other fixing system fixed to the cam 13/29 may preferably allow the cable to be positioned in line with the pairing belt. The pairing belt will guide the cable as far as the cable guide 43 fixed to this belt. When the motor 11 and the cam 13 rotate, together, the cable 111 will move at the same time as the belt 27*a*. A second loop may preferably allow the cable to be connected to a fixed point of the mobile beam 9, effecting only a translational movement as is preferably required by the rules of the art. The fixed attachment of the other end of the cable to the fixed beam 7 has been indicated schematically as 47.

In terms of operation, the procedure for moving, for example two door leaves such as 3*a*, 3*b* between the aforementioned respectively closed and open positions along the opening 50 of the body 5 that they uncover in the open position to allow passengers to circulate here is as follows:

using the motor 11, the drive means (notably the belt already mentioned) and the pairing means 27, each leaf is forced to move along this opening 50, therefore with the maneuvering imposed with respect to the body 5 and, in order to achieve that:

the central roller 15 connected to the relevant leaf is made to run along the groove 17 of the fixed beam 7 the angled shape 17a of which groove imposes the sliding movement and the maneuvering movement at the start of opening or at the end of closing, and the mobile beam 9, and therefore the leaves, are given the desired transverse movement with respect to the axis of elongation 7a of the fixed beam, along the fixed maneuvering rails 19a, 19b, this therefore being achieved using the motor 11 which, likewise fixed to the mobile beam 9, therefore, by rotating during the maneuvering movement, drives the driving cam 13, in the slot 23 of which the pin 21 runs and which, fixed to the fixed beam 7, forces the mobile beam 9 to effect a maneuvering movement strictly parallel to the axis of elongation 7a of the fixed beam, by virtue of the pairing means 27, the driven cam 29 and the pin 42.

As already mentioned, for a suitable movement of the leaves so that they pass from the locked closed position into the open position along the body shell of the vehicle and vice versa, it is recommended that the transverse movement of the mobile beam 9 be performed at the end of movement toward closing and at the start of movement toward opening, the leaves therefore maneuvering.

Between the respectively closed and open positions, the pin 21 will then run:
along the second part 23b,
and along the first part 23a in the form of a helix of the slot of the driving cam 13.

Figure 19:
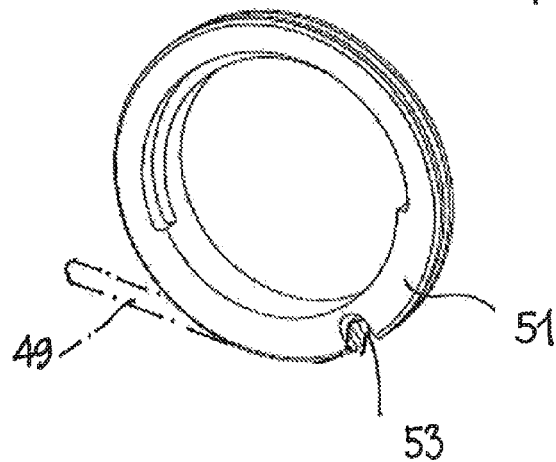
FIG. 19 shows unlocking means.

It will also be noted that manual or emergency unlocking will preferably take place either by powering the motor 11 or by causing the cam, such as 13, to turn, using a cable 49 fixed to an unlocking pulley 51 (FIGS. 9, 19). A cutout 53 in the pulley will preferably allow the normal movements of the cam without the pulley turning but will allow the cam to be turned when the cable 49 drives the pulley in the door closed and locked position. This cable will preferably be extended by a spring (or other return means) which will allow the cable and the pulley 51 to return to their position when the emergency-unlocking handle is released.

In the aforementioned device, considered in all or part of the features thereof, the following advantages may be mentioned:

the length of the mechanism is greatly reduced by comparison with what already exists (excluding the hangers and fixings of the vertical pairing bars or arms) and it is possible to use the same mechanism for free passages ranging from 1200 to 1500 mm without modifying the components: over 90° of the components are common to two double-door mechanisms with different free passages, and more than 70% of components are common to a double door or a single door, the guide system is designed such that the loads exerted on the door in the Oy direction (pressure wave, pressure of passengers) do not cause the door to unlock, attempts to open the door and longitudinal impacts will not unlock this door either, because of the central roller such as 15 which necessitates the application, simultaneously with longitudinal sliding thereof, of a transverse movement which remains blocked by the cam such as 13, the bulkiness of the mechanism is greatly reduced by comparison with what already exits, the bulk required beyond the free passage for attaching the vertical pairing bars may be less than 210 mm for a single door and 190 mm for a double door, choosing a belt drive rather than a screw-nut drive should reduce the noise emitted by the mechanism during openings or closings, in comparison with what already exists.

The invention claimed is:

1. A device for moving at least one transport vehicle door leaf to allow passengers to enter and exit the vehicle comprising:
    a body with respect to which the leaf moves between an open and a closed position;
    a fixed beam, fixed to the body and having an axis of elongation;
    a mobile beam having an axis of elongation substantially parallel to that of the fixed beam and connected to the leaf so that the leaf slides along the mobile beam, the mobile beam is connected to the fixed beam by maneuvering rails that are fixed with respect to the fixed beam and that support the mobile beam to allow the mobile beam a movement that is transverse with respect to the axes of elongation of the fixed and mobile beam;
    a motor fixed to the mobile beam, the motor extending along one of the maneuvering rails, along an axis of rotation transverse to the axis of elongation of the fixed beam, and bears the driving cam coaxially, and arranged to drive the leaf in a movement parallel to the axis of elongation of the mobile beam and, during the maneuvering of the leaf, to drive a driving cam that is provided with a slot in which is engaged a pin fixed to the fixed beam; and,
    a central roller connected to the mobile beam, fixed to the leaf, and which runs in a groove of the fixed beam as the leaf moves,
    wherein a first part of the slot of the driving cam has the form of a helix with an axis transverse to the axes of elongation of the fixed and mobile beams.

2. The device of claim 1 further comprising sliders and rails connected to the mobile beam in order to connect it to the leaf.

3. The device of claim 1 wherein the groove of the fixed beam, which extends horizontally, has, toward one end, a part extending at an angle with respect to the axis of elongation of the fixed beam so as to force the leaf to maneuver.

4. The device of claim 1 wherein the motor extends along one of the maneuvering rails, along an axis of rotation transverse to the axis of elongation of the fixed beam, and bears the driving cam coaxially, which driving cam, via a pairing means, drives a driven cam arranged along the other rail, the driven cam comprising a slot in which a second pin fixed to the fixed beam is engaged.

5. The device of claim 4 wherein a first part of the slots of the driving cam and driven cam has the form of a helix of axis transverse to the axes of elongation of the fixed and mobile beams, and a second part of the slots of the driving and driven cams has the form of a portion of a circle of axis parallel to the axis of elongation of the fixed beam.

6. The device as claimed in claim 4 further comprising:
    a return mechanism to return the driven cam such that the second pin remains engaged in the circular-arc portion of the slot; and
    a pairing means forcing the first pin and the driving cam to adopt the same relative position.

7. The device as claimed in claim 4 wherein the motor is electrically powered by a cable that passes along the pairing means and around the cam, and that is fixed to the cam and to the pairing means by tabs positioning the cable in line with the pairing means.

8. The device of claim 1 wherein the motor has a stator that rotates to drive the driving cam, the device further including rolling bearings permitting that when the central roller reaches said part of the groove that extends at an angle.

9. The device of claim 1 wherein the motor is connected by a reduction gear to a pulley for driving the leaf.

10. The device of claim 1 wherein a second part of the slot of the driving cam has the form of a portion of a circle of axis parallel to the axis of elongation of the fixed beam.

11. A rail transport vehicle comprising:
a body,
at least one door leaf allowing passengers to enter and exit the body, with respect to which the leaf moves between respectively open and closed positions,
and the device of claim 1.

12. The vehicle of claim 11, wherein a part of the slot of the driving cam has a form of a portion of a circle of axis parallel to the axis of elongation of the fixed beam, and extends with an orientation that is slightly re-entrant toward an inside of the slot, with a shape of a dovetail.

13. A method for moving at least one door leaf along an opening of a transport vehicle body, between respectively closed and open positions allowing passengers to enter and exit the vehicle,
the device including:
a body with respect to which the leaf moves between an open and a closed position;
a fixed beam, fixed to the body and having an axis of elongation;
a mobile beam having an axis of elongation substantially parallel to that of the fixed beam and connected to the leaf so that the leaf slides along the mobile beam, the mobile beam is connected to the fixed beam by maneuvering rails that are fixed with respect to the fixed beam and that support the mobile beam to allow the mobile beam a movement that is transverse with respect to the axes of elongation of the fixed and mobile beam;
a motor fixed to the mobile beam, the motor extending along one of the maneuvering rails, along an axis of rotation transverse to the axis of elongation of the fixed beam, and bears the driving cam coaxially, and arranged to drive the leaf in a movement parallel to the axis of elongation of the mobile beam and, during the maneuvering of the leaf, to drive a driving cam that is provided with a slot in which is engaged a pin fixed to the fixed beam; and,
a central roller connected to the mobile beam, fixed to the leaf, and which runs in a groove of the fixed beam as the leaf moves,
wherein a first part of the slot of the driving cam has the form of a helix with an axis transverse to the axes of elongation of the fixed and mobile beams, and
wherein the leaf is forced to move along the opening, with maneuvering with respect to the body of the vehicle, the method comprising:
using the motor to make a central roller fixed to the leaf run along an opening of the body in the groove of the elongate fixed beam fixed to this body,
and, at the end of the movement of the leaf in a direction of closing or at the start of the movement in a direction of opening, imparting to the mobile beam connected to the leaf, a transverse movement with respect to the axis of elongation of the fixed beam, in the maneuvering rails that are fixed with respect to the body using the motor and the central roller the path of which imposes the transverse movement by a part of the groove of the fixed beam that extends at an angle with respect to the axis of elongation of this fixed beam.

14. The method of claim 13 wherein the transverse movement of the mobile beam maintains the parallelism of the mobile and fixed beams by virtue of two pins that respectively run in a first and a second slot, at least partially shaped as a helix, one of them belonging to a driving cam driven by the rotation of the motor and the other belonging to a driven cam driven by the driving cam by virtue of a pairing means.

15. The method of claim 13 wherein, as the leaf maneuvers, the motor, fixed to the mobile beam, is made to drive a driving cam provided with a slot in which a pin fixed to the fixed beam is engaged.

16. The method of claim 13 wherein the locking of the leaf in the closed position is ensured:
by making the two pins run respectively in the first and second slots of which part has a form of a portion of a circle of axis parallel to the axis of elongation of the fixed beam extending with an orientation that is slightly re-entrant toward an inside of the slot, in a shape of a dovetail,
and by keeping the two pins in position using a return means that urges one of the cams in such a way that the pin it accommodates remains engaged in a circular-arc portion of the slot with which it is provided, the pairing means forcing the other pin and the other cam to adopt the same relative position.

* * * * *